United States Patent
Green et al.

(10) Patent No.: US 9,291,234 B1
(45) Date of Patent: Mar. 22, 2016

(54) LOAD ADAPTING VIBRATION ISOLATION PALLET MECHANISMS

(71) Applicant: International Business Machines Corporation, Armonk, NY (US)

(72) Inventors: Kenton C. Green, Cary, NC (US); William J. Green, Cary, NC (US); Michael D. O'Connell, Rochester, MN (US); Eric A. Stegner, Durham, NC (US); Robert W. Stegner, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/471,192

(22) Filed: Aug. 28, 2014

(51) Int. Cl.
  *B65D 19/38* (2006.01)
  *F16F 15/08* (2006.01)

(52) U.S. Cl.
  CPC ........... *F16F 15/08* (2013.01); *B65D 19/38* (2013.01); *B65D 2519/00736* (2013.01)

(58) Field of Classification Search
  CPC ......... B65D 19/40; F16F 15/08; F16F 15/00; F16F 15/02; F16F 15/022; F16F 15/0275
  USPC ........... 108/57.12, 51.11; 248/638, 636, 566, 248/574
  See application file for complete search history.

(56) References Cited

U.S. PATENT DOCUMENTS

| | | | | |
|---|---|---|---|---|
| 1,897,014 A | * | 2/1933 | Trott | 248/638 |
| 2,397,804 A | * | 4/1946 | Nakken et al. | 248/574 |
| 2,660,387 A | * | 11/1953 | Roy | 248/638 |
| 3,101,063 A | | 8/1963 | Wharton | |
| 3,275,131 A | * | 9/1966 | Erickson | 108/57.12 |
| 3,430,901 A | * | 3/1969 | Cauvin | 248/638 |
| 3,469,809 A | * | 9/1969 | Fekete et al. | 248/638 |
| 4,687,079 A | | 8/1987 | Gladish | |
| 4,711,135 A | * | 12/1987 | Horiuchi et al. | 248/638 |
| 4,744,539 A | * | 5/1988 | Stimeling | 248/638 |
| 4,812,932 A | * | 3/1989 | Hishinuma et al. | 248/566 |

(Continued)

FOREIGN PATENT DOCUMENTS

| | | |
|---|---|---|
| JP | H07291289 A | 7/1995 |
| JP | 2007039067 A | 2/2007 |
| WO | WO2012027021 A1 | 3/2012 |

OTHER PUBLICATIONS

List of IBM Patents or Patent Applications Treated as Related (Appendix P), 2 pages.

*Primary Examiner* — Jose V Chen
(74) *Attorney, Agent, or Firm* — Stephen J. Walder, Jr.; Damien Josephs

(57) ABSTRACT

An isolation system for a transportation pallet, a transportation pallet, and a method of providing an isolation system are provided. The isolation system comprises a plunger assembly comprising a graduated surface area having a first end with a relatively smaller surface area than a second end having a relatively larger surface area. The isolation system further comprises a cushion pad coupled to the plunger assembly such that when a load is applied to the plunger assembly, the plunger assembly is pressed into the cushion pad to cause the cushion pad to bear the load over a surface area of the plunger assembly corresponding to the magnitude of the load. When the load is increased, a larger surface area of the plunger assembly and the cushion pad supports the load and as the load decreases, a smaller surface area of the plunger assembly and cushion pad supports the load.

19 Claims, 9 Drawing Sheets

(56) References Cited

U.S. PATENT DOCUMENTS

| | | | |
|---|---|---|---|
| 5,386,962 A * | 2/1995 | Adriance et al. | 248/638 |
| 5,427,347 A * | 6/1995 | Swanson et al. | 248/638 |
| 5,970,886 A | 10/1999 | Knio | |
| 6,000,671 A * | 12/1999 | Helms | 248/638 |
| 6,003,897 A * | 12/1999 | Dostert et al. | 248/638 |
| 6,095,481 A * | 8/2000 | Norkus et al. | 248/638 |
| 6,115,972 A * | 9/2000 | Tamez | 248/566 |
| 6,129,326 A * | 10/2000 | Mandon | 248/638 |
| 6,155,530 A * | 12/2000 | Borgen | 248/638 |
| 6,254,068 B1 * | 7/2001 | Chen et al. | 248/638 |
| 6,354,558 B1 * | 3/2002 | Li | 248/638 |
| 6,418,862 B1 | 7/2002 | Heil | |
| 6,470,649 B2 | 10/2002 | Usui et al. | |
| 7,096,798 B2 * | 8/2006 | Gruber | 108/57.12 |
| 7,416,244 B2 * | 8/2008 | Polk et al. | 248/638 |
| 7,621,705 B2 | 11/2009 | Hillberry et al. | |
| 7,891,922 B2 | 2/2011 | Fukuda | |
| 8,424,702 B2 | 4/2013 | Cassina | |
| 8,448,962 B2 | 5/2013 | Kalyani et al. | |
| 2007/0221102 A1 | 9/2007 | Reinhall | |
| 2012/0049479 A1 | 3/2012 | Kalyani et al. | |
| 2014/0086718 A1 * | 3/2014 | Bush | 108/57.12 |

* cited by examiner

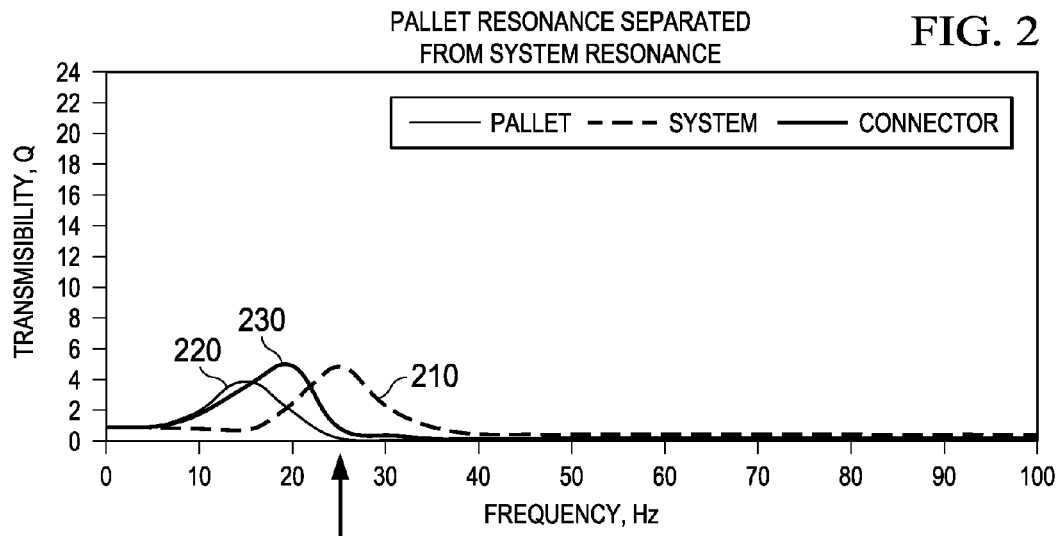
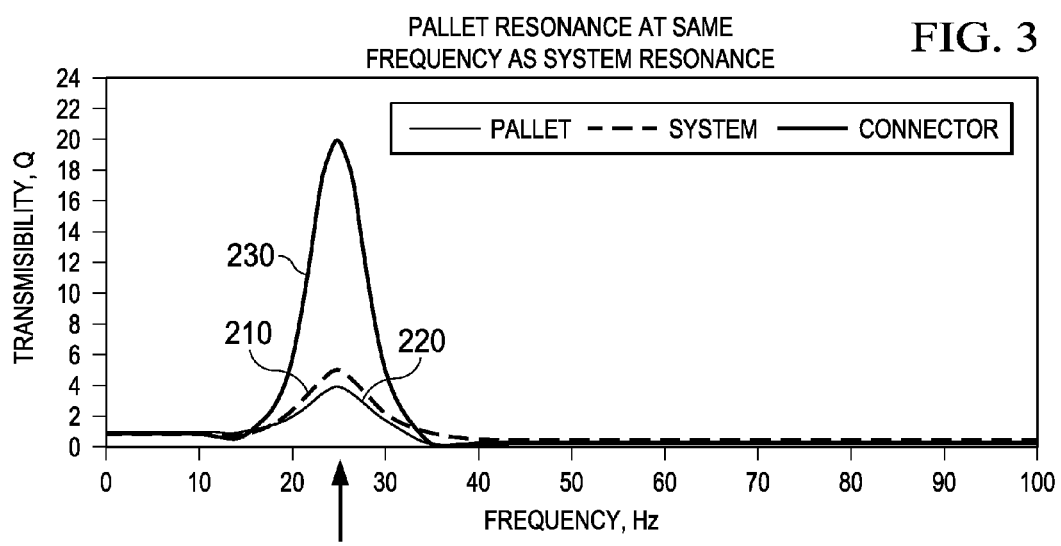

LOAD ADAPTING VIBRATION ISOLATION PALLET MECHANISMS

BACKGROUND

The present application relates generally to an improved data processing apparatus and method and more specifically to mechanisms for providing a load adapting vibration isolation pallet.

The transportation environment for sensitive computing equipment has become more rigorous as global sourcing and customer locations have increased transportation distance significantly. Moreover, depending upon location infrastructure, the roadways and shipping lanes that must be traversed to bring computing equipment to the customer may cause significant vibration to be applied to the computing equipment while it is being transported. This becomes more of an issue with computing equipment as signal and power connectors become smaller and less tolerant to vibration. As a result, connector wear during shipment due to vibration has become a major issue in the transportation of computing equipment.

SUMMARY

In one illustrative embodiment, an isolation system for a transportation pallet is provided. The isolation system comprises a plunger assembly comprising a graduated surface area having a first end of the plunger assembly with a relatively smaller surface area than a second end having a relatively larger surface area. The isolation system further comprises a cushion pad coupled to the plunger assembly such that when a load is applied to the plunger assembly, the plunger assembly is pressed into the cushion pad to cause the cushion pad to bear the load over a surface area of the plunger assembly corresponding to the magnitude of the load. When the load is increased, a larger surface area of the plunger assembly and the cushion pad supports the load and as the load decreases, a smaller surface area of the plunger assembly and cushion pad supports the load.

In another illustrative embodiment, a transportation pallet for transporting sensitive products is provided. The transportation pallet comprises a pallet comprising an upper deck and a lower deck, and an isolation system located between the upper deck and the lower deck of the pallet. The isolation system comprises a plunger assembly comprising a graduated surface area having a first end of the plunger assembly with a relatively smaller surface area than a second end having a relatively larger surface area. The isolation system further comprises a cushion pad coupled to the plunger assembly such that when a load of a product loaded onto the pallet is applied to the plunger assembly via the upper deck of the pallet, the plunger assembly is pressed into the cushion pad to cause the cushion pad to bear the load over a surface area of the plunger assembly corresponding to the magnitude of the load. As the load is increased, a larger surface area of the plunger assembly and the cushion pad supports the load and as the load decreases, a smaller surface area of the plunger assembly and cushion pad supports the load.

In still a further illustrative embodiment, a method of providing a vibration isolation system for a pallet used to transport a product is provided. The method comprises providing a pallet comprising an upper deck and a lower deck. The method further comprises providing an isolation system located between the upper deck and the lower deck of the pallet. Providing the isolation system comprises providing a plunger assembly comprising a graduated surface area having a first end of the plunger assembly with a relatively smaller surface area than a second end having a relatively larger surface area. Providing the isolation system further comprises providing a cushion pad coupled to the plunger assembly such that when a load of a product loaded onto the pallet is applied to the plunger assembly via the upper deck of the pallet, the plunger assembly is pressed into the cushion pad to cause the cushion pad to bear the load over a surface area of the plunger assembly corresponding to the magnitude of the load. As the load is increased a larger surface area of the plunger assembly and the cushion pad supports the load and as the load decreases, a smaller surface area of the plunger assembly and cushion pad supports the load.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 2 is an example plot of pallet, computing system, and connector resonance frequency versus transmissibility for a desired isolation system design and a load of approximately 2000 pounds;

FIG. 3 illustrates a similar plot as shown in FIG. 2 but with a loading of approximately 100 pounds;

DETAILED DESCRIPTION

Figure 1:
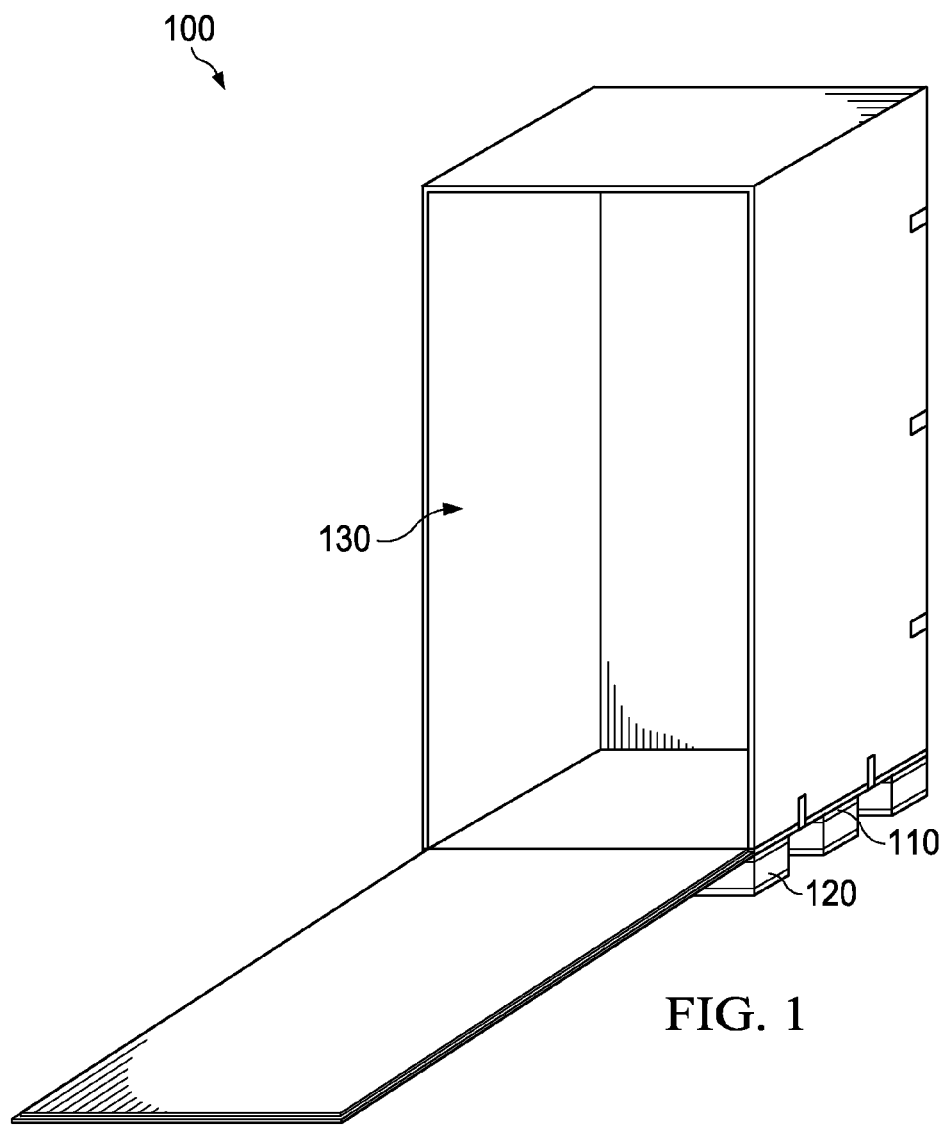
FIG. 1 is an example diagram of a known shock pallet for transporting electronic equipment.

The illustrative embodiments provide load adapting vibration isolation pallet mechanisms. The mechanisms of the illustrative embodiments provide a pallet that significantly reduces vibration transferred to the palletized products that are being transported, e.g., computing equipment or electronic equipment, while being able to adapt to various loads, e.g., weights of products. The term "palletized product" is used throughout this description to refer to the product that is being transported in or by the load adapting vibration isolation pallet of the illustrative embodiments. The product is not limited in its type, but will generally be any physical article that may be sensitive to vibration and thus, the load adapting vibration isolation pallet of the illustrative embodiments is employed to minimize the vibration transmitted to the physical article. As mentioned above, one type of palletized product may be computing equipment or electronic equipment. However, other types of palletized products may include engines, medical equipment, artwork, sculptures, house wares (china, appliances, etc.), or any other article that may be breakable or damageable due to vibration and/or overturning of the pallet.

With the mechanisms of the illustrative embodiments, a plunger system with varying load bearing area is provided which changes the stiffness of the isolation system as the load on the pallet increase/decreases. This avoids vibration frequencies approaching a resonant frequency of the palletized product being transported and thereby reduces unwanted consequences of vibration on the palletized product itself, connectors and other sensitive components of the palletized products, and the like, during transportation. In order to reduce motion at the pallet resonance frequency without increasing damping (and consequently imparting additional vibration to the palletized products at a resonance frequency of the palletized products), a single sided isolation (compression and not tension) system is utilized. In addition, a bottom member or deck of the pallet is provided in conjunction with a constraint system comprising a fastener with a highly damped retention pad to prevent overturning of the pallet and products while still being able to provide a single sided isolation system.

In order to better understand the improvements and advantages afforded by the mechanisms of the illustrative embodiments, it is first important to understand the currently used pallet mechanisms for handling transportation of products. In particular, the mechanisms of the illustrative embodiments are especially well suited for use in the transportation of computing systems, electronic equipment, and the like, that have connectors and other components that are sensitive to vibration, i.e. the oscillation of a repetitive motion of an object about an equilibrium point, but may also be used for transporting other products, goods, etc. that are sensitive to vibration, e.g., vehicle or equipment engines, medical equipment, artwork, sculptures, and the like. One implementation of the illustrative embodiments is a load adapting vibration isolation pallet mechanism for transporting server computing systems and/or racks of server computing systems, such as a rack of one or more blade chassis with one or more blade servers (or "blades") provided in the one or more blade chassis.

Currently, the way in which such electronic equipment is transported is to use what is referred to as a "shock pallet" as shown in FIG. 1. The shock pallet 100 comprises a plywood deck 110 with a shock absorbing cushion or foam 120 underneath the plywood deck 110 to reduce shocks from reaching the product in the enclosed plywood compartment 130 from the movement of the vehicle in which the shock pallet 100 is transported. Unfortunately, these shock pallets 100 have several drawbacks. First, the shock absorbing cushion 120 due to its material and configuration does not absorb vibration or isolate the product from vibration to an acceptable level for the transportation of sensitive products, e.g., computing equipment, electronic equipment, medical equipment, engines, artwork, or other types of sensitive products. In fact, in many cases, the shock absorbing cushion 120 actually amplifies the vibration frequency range that needs to be attenuated to protect the sensitive product being transported, e.g., 25 to 30 Hz vibration frequency for connectors of blade center chassis racks. This is because the shock absorbing cushion 120 is designed to have a large stiffness to reduce the large shocks. The result of the stiffness of the cushion is that the cushion 120 drives the resonant frequency up to approximately 25 to 30 Hz where the sensitive product is sensitive to vibration input. Thus, with these absorbing cushions 120, one could optimize a system for shock absorption or vibration reduction, but not both.

Secondly, the shock pallet 100 is not tolerant of a wide range of loads in the plywood compartment. That is, the shock pallet 100 only works well with a certain load for which it is designed and thus, a very narrow load range around the design load, e.g., if the design load is 100 pounds, then the shock pallet 100 works well for loads within a small range of 100 pounds, for example 90 to 120 pounds. However, many providers of products ship products of various loads using the same pallet configurations. For example, International Business Machines (IBM) Corporation, of Armonk, N.Y., often ships rack mounted sensitive equipment that may range in load from approximately 100 pounds to approximately 2000 pounds and such shock pallets 100 are not designed to accommodate such a wide range of loads. Moreover, the shock pallet 100 is not designed to adjust its vibration response based on changes in load. For example, a provider may ship a product, e.g., a rack, with a very light load to a value add reseller (VAR) who then, in turn, may add thousands of pounds of additional equipment to the rack and use the same shock pallet 100 for transportation of the modified load. In such a case, either when shipping the light load, or when shipping the higher load, or both, the vibration response of the shock pallet 100 is not optimal since the shock pallet 100 is not designed for the varying loads.

As a third drawback, the shock pallet 100 has a vibration resonance and, in order to keep the vibration resonance from becoming problematic, the vibration isolation afforded by the shock absorbing cushion 120 is achieved by using a material with high damping to reduce the mechanical amplification at the vibration resonance. Unfortunately, the shock absorbing cushion 120 can in fact transmit more vibration energy to the product being transported at higher frequencies, which can damage the product.

That is, the vibration energy from the vehicle is the same for all of the shock pallets 100 being transported. However, the pallets 100 themselves modify the vibration by amplifying the vibration at some frequencies and attenuating the vibration at other frequencies. Stiff pallets, such as those used for shock absorption, tend to have relatively higher resonant frequencies, meaning that they amplify the high frequencies. This is generally an undesirable effect for sensitive products as discussed above. However, a less stiff or soft pallet lowers the resonant frequency of the pallet so that there is less damaging vibration getting through the pallet to the sensitive product at its sensitive frequency range, e.g., 25 to 30 Hz. Thus, varying the stiffness will change the resonant frequency which can prevent energy reaching the sensitive product at the sensitive frequency range.

Another characteristic of the pallet 100 is its damping, i.e. the energy that is lost, usually to heat. Since damping can reduce the amplitude of vibration, it is often thought of as a positive effect. However, in many cases damping can in fact make situations worse. As will be discussed in greater detail hereafter, damping can in fact reduce the amplitude of vibration at lower frequencies, but may increase the vibration amplitude at higher frequencies, which may include the sensitive frequency range of the sensitive products.

A fourth drawback concerns the application of side loads to the product being transported, such as because of fork truck handling, ramps, vehicle motion of vehicles transporting the pallet and product, etc. If not restrained properly, the product being transported could overturn resulting in catastrophic damage to the product and potentially causing injuries or even death for personnel involved in the transportation of the product. Known pallet configurations use thick shock absorbing cushions 120 in the corners of the shock pallet 100, but these shock absorbing cushions 120, even with their increased thickness, can allow excessive motion of the transported product and may even allow the product to tear loose of the shock pallet 100 resulting in the product overturning and damage to the product.

The illustrative embodiments provide a number of improvements to shock pallets to avoid the drawbacks outlined above. In particular, the illustrative embodiments provide a load adapting vibration isolation pallet that uses a neoprene, or other suitable cushion material, pad mechanism and plunger system that is configured for adapting to varying loads. The illustrative embodiments further provide a constraint system that prevents overturning of the pallet and product without losing the benefits of a single sided isolation system. These mechanisms will be described hereafter with regard to the transportation of racks of sensitive computer equipment, i.e. an example palletized product. It should be appreciated that while the mechanisms of the illustrative embodiments will be described hereafter with regard to a load adapting vibration isolation pallet that is used for the transportation of racks of computer equipment comprising various types of connectors, the illustrative embodiments are not limited to such and may be used with the transportation of any good or product that is sensitive to vibration or may be damaged due to an overturning of the pallet.

With regard to the transportation of racks of computer equipment, such as racks comprising one or more blade chassis and blade servers within the blade chassis, the computer equipment often has many connectors that are sensitive to vibrations that occur during transportation of the computer equipment. For example, connectors between blade servers, chassis, hard drives and their slots, power supplies in slots, cables, or any other connection having a male end that plugs into a female slot. In general, with a connection of any of these types, the connection conducts a current or signal of some kind which generally requires an electrical signal conductive coating (e.g., gold or other conductive metal/material) to be provided on the male and female ends that are connected to one another. If the two parts of the connection, i.e. the part having the male end of the connection and the part having the female end of the connection, do not move in unison, the relative motion between the male and female ends cause the conductive coating to rub off. This can cause signal/current degradation, as well as corrosion, which can cause problems in the operation of the computing equipment. Thus, it is desirable to reduce the effects of vibration on the computing equipment during transportation as much as possible. For example, it is desirable to isolate computing equipment products from vibrations in approximately the 25 to 30 Hz range, i.e. the problem frequency range, where there may be significant connector wear.

As mentioned above, the foam materials used in shock absorbing cushions 120 of known shock pallets 100 are not effective in isolating the transported product from vibrations, and especially in the 25 to 30 Hz range where connectors of electronic devices may become damaged. The mechanisms of the illustrative embodiments utilize a cushioning material that is designed to allow the palletized product, i.e. the product being transported, to have a pallet resonance frequency at 13 Hz, which will result in a good isolation of the palletized product in the problem frequency range of 25 to 30 Hz where the product is most sensitive, e.g., connector wear occurs. In one illustrative embodiment, the cushioning material is a heavy duty synthetic rubber, such as a heavy duty neoprene material, that is formed into pads used in the configuration described hereafter to provide a vibration damping material. It should be appreciated that while the illustrative embodiments will be described as utilizing neoprene pads, other types of cushioning materials may be utilized as well or instead of the neoprene pads including other types of synthetic elastomer (rubber) materials and non-elastomer materials, e.g., polyethylene, polystyrene, polyurethane, polypropylene pads, or bio-based materials.

With regard to the use of neoprene as a cushioning material, it has been determined that the most commonly used material for shock absorption in shock pallets is polyethylene foam which can handle moderate loads and is more robust than other shock foams. Unfortunately, once the loading (pounds per square inch) on the polyethylene foam is increased to achieve vibration isolation at 25 to 30 Hz, the polyethylene foam collapses and becomes useless. The present inventors have determined that a high density neoprene material may be used to provide vibration isolation for large loads and can achieve a low resonant frequency, such as approximately 13 Hz, which will effectively isolate and protect palletized products in the problem frequency range of approximately 25 to 30 Hz. Providing cushioning pads at the outer edges, corners, and other suitable locations, of the pallet will adequately support a fully configured rack of computing equipment at approximately 2000 pounds, e.g., providing 6 pads place at the corners and edges of the pallet with each pad being 2 layers thick (each layer being ⅜ inch thick) and 2.5 inches×2.5 inches in size. While this will provide sufficient cushioning to isolate the palletized product from vibration, the use of this material alone does not resolve the concerns with regard to effective isolation with a large range of varying loads.

To fully understand the concerns with regard to vibration isolation over a large range of varying loads, one must first understand how a vibration isolation system is generally designed. Initially one or more critical components, i.e. the component of the palletized product that is most often damaged during transportation, are identified that have a problem frequency range, i.e. a frequency range in which damage to the component often occurs or is most likely to occur. For example, in the case of a rack of computing equipment, the critical component may be the connectors in the rack of computing equipment. In this example case, the problem frequency range is approximately 25 to 30 Hz due to the product chassis having a resonance frequency at approximately 25 to 30 Hz. If the chassis is excited with vibration in this range, the chassis motion will wear on the connectors causing the problems previously described above due to the conductive material being rubbed off of the connectors, connectors becoming loose, or the like.

In order to protect the product and its critical components, a vibration isolation system needs to be designed. The "isolation system" comprises the components of the pallet used to isolate vibrations applied to the pallet from reaching the palletized product. This may include, for example, cushion pads, fasteners, and the like. As will be described hereafter, the isolation system of the illustrative embodiments includes a cushion pad, plunger system, fastener, upper and lower members or "decks" of the pallet itself, and in some illustrative embodiments a retention pad and fastener stop constraint. Thus, herein the term "isolation system" will be used to refer to the components of the pallet that are used to isolate vibration from the palletized product whereas the term "pallet" is used to refer to the platform and optional container in which the palletized product is transported. It should be appreciated that the "pallet" may comprise the "isolation system."

In designing the isolation system, in general the isolation system should be designed such that the isolation system with the palletized product on top of it will have a natural or resonant frequency of about half of the problem frequency of the critical components. This will cause the isolation system to be a poor transmitter of the problem higher frequency range vibrations.

FIG. 2 is an example plot of pallet, computing system (or just "system"), and connector resonance frequency versus transmissibility for a desired isolation system design and a load of approximately 2000 pounds. As shown in FIG. 2, the computing system has a resonance at 25 Hz (represented by plot curve 210). The isolation system of the pallet, when properly designed, would have a natural frequency of 13 Hz (represented by plot curve 220) and, as a result, the isolation system causes the pallet to transfer very little vibration to the product in the 25 to 30 Hz range. The result is the vibration motion at the connectors represented by plot curve 230. Thus, this is a well designed system which results in a relatively low transmissibility of 5 for the connectors at 19 Hz. Thus, if the isolation system of the pallet were carrying a load of approximately 2000 pounds, the isolation system and pallet would be identified as having optimal characteristics for that load.

However, often times pallets must be used to ship palletized products that may be of varying weights depending on the particular product, and the weights may vary over a large range of possible weights, e.g., from 100 pounds to 2000 pounds. Moreover, in some instances, the weight of the palletized product may vary during transportation, e.g., additional equipment added to the palletized product during transport, such as in the case of the VAR reseller mentioned above. That is, the pallet and isolation system may be reused for different loads. For example, in the example pallet/isolation system whose characteristics are depicted in FIG. 2, the pallet/isolation system may be used to transport a load of only 100 pounds, which will change the resonant frequency of the isolation system/pallet and consequently its isolation frequency and performance. The following equation describes how an isolation system's resonant or natural frequency (Fn) is affected by changes in mass (load):

$$Fn = (1/2\pi) * \text{sqrt}(k/m) \quad \text{(Eq. 1)}$$

where Fn is the natural frequency in Hertz (cycles/second), k is the stiffness of the spring (Newtons/meter), and m is the mass (kg). Thus, from equation 1 (Eq. 1) one can see that if there is a significant reduction in mass (m) or load, the natural frequency Fn increases significantly. This will have unfortunate consequences for the connectors in the palletized product or other critical components of the palletized product that are sensitive to vibrations. That is, as shown in FIG. 3, which illustrates a similar plot as shown in FIG. 2 but with a loading of approximately 100 pounds, because the mass of the system is significantly reduced, the pallet resonance frequency is increased to 25 Hz, i.e. the same frequency as the natural frequency of the palletized product. To determine the vibration levels that the connectors experience, one can multiply the pallet transmissibility by the computing system transmissibility at each frequency and it can be determined that the connectors experience up to 20 times the vibration of the transporting vehicle with a light pallet load (approximately 100 pounds) compared to 5 times the vibration with a heavy pallet load (approximately 2000 pounds) in the above example. This essentially increases the connector wear by a factor of 4. This increase is due to the inflexibility of the isolation system and pallet to differing loads over a wide load range.

To address this issue, the illustrative embodiments provide an isolation system that is capable of changing its stiffness as the load on the pallet is increased or decreased. The illustrative embodiments utilize a plunger system comprising a plurality of load bearing elements of varying sizes for varying the stiffness of the isolation system and pallet. Due to the varying load bearing elements of the plunger system, different amounts of stiffness are achievable as the load changes and thus, the amount of vibration isolation afforded by the isolation system may be maintained over a wide range of loads on the pallet.

Figure 4:
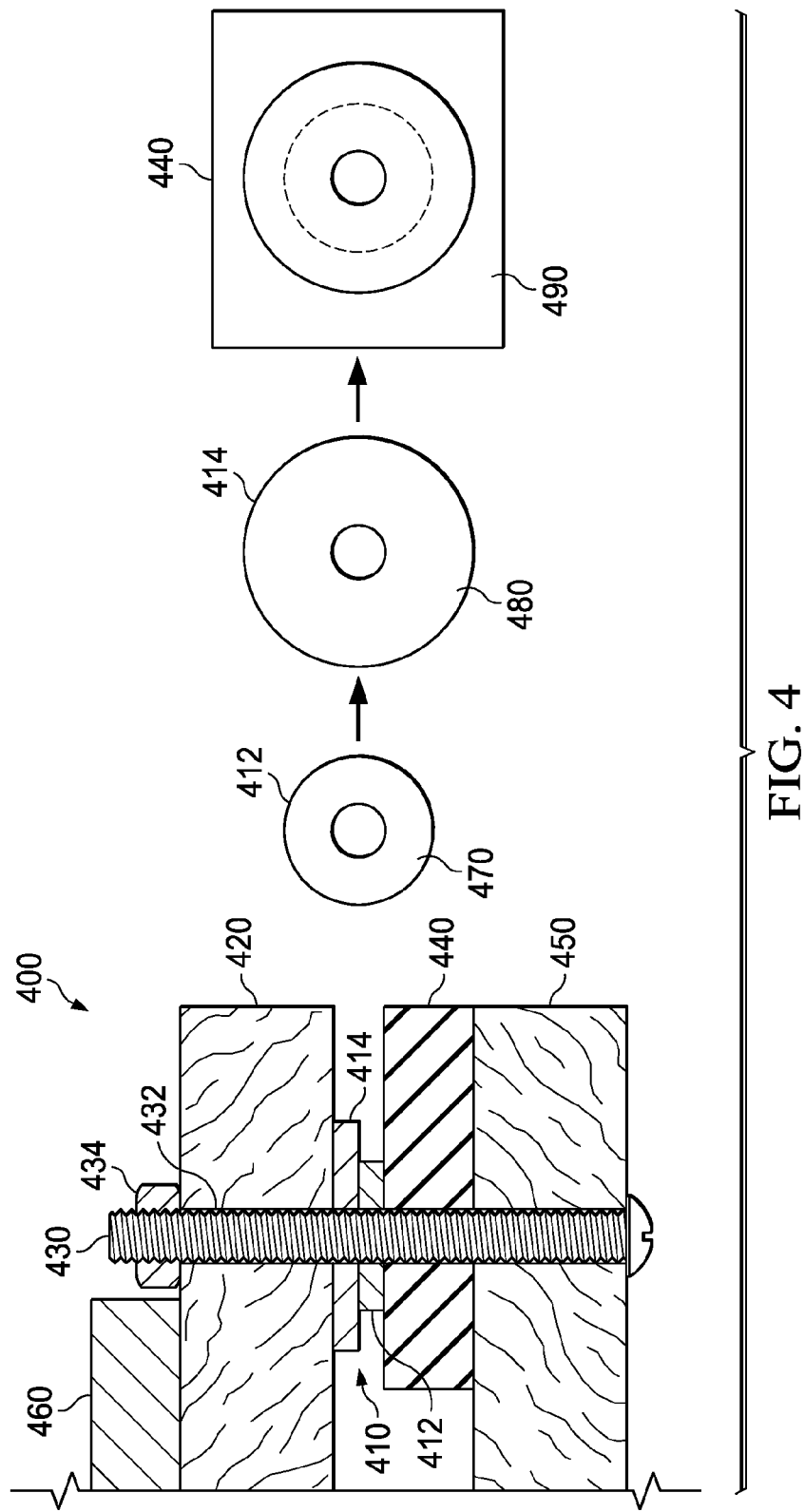
FIG. 4 is an example diagram illustrating an example isolation system in accordance with one illustrative embodiment.

FIG. 4 is an example cross-sectional diagram illustrating an example isolation system in accordance with one illustrative embodiment. As shown in FIG. 4, the isolation system 400 comprises a plunger system 410 that may be attached to an upper member or deck 420 of the pallet and fastened thereto by a fastener 430. A cushion pad 440 of the isolation system 400 is provided on an opposite side of the plunger system 410 from the upper member 420 and is attached to the lower member or deck 450 of the pallet. The fastener 430 comprises a fastener core member 432 and fastener end or stop constraint 434. The fastener core member 432 and fastener stop constraint 424 may comprise, in one illustrative embodiment, a metal bolt and nut assembly in which the fastener core member (bolt) 432 passes through a hole or opening in the lower member 450, the cushion pad 440, the plunger system 410, and the upper member 420 and the fastener stop constraint (nut) 434 is provided on the opposite side of the upper member 420 to fasten the elements 410-450 together. Of course, an opposite configuration may also be used in which the nut 434 is provided on the opposite side of the lower member 450 from the cushion pad 440. Moreover, other types of fasteners may be utilized other than a nut and bolt assembly as long as the fastener serves to hold the elements 410-450 together such that the plunger system 410 and cushion pad 440 are sandwiched between the upper member 420 and the lower member 450.

In one illustrative embodiment, the upper and lower members or decks 420 and 440 are fabricated from a wood material, however this is not required. The upper and lower members 420 and 440 may be formed from any suitable material for forming a pallet upon which a product is to be placed for transport including, but not limited to, a plastic material, metal material, or the like. The cushion pad 440, in some illustrative embodiments, is formed from an elastomer material, such as a neoprene material as previously described above, which is configured for providing an isolation system or pallet with a natural frequency of approximately 13 Hz. In other illustrative embodiments, the cushion pad 440 may be formed from any suitable elastomer or non-elastomer material including, but not limited to, those material described above, which is configured to provide a natural frequency isolation system or pallet that is suitable to the particular loadings expected and resonance frequencies of the products being transported on the pallet.

The plunger assembly 410 comprises a plurality of load distribution elements 412 and 414 having different sizes or widths with differing amounts of load bearing surfaces. The load distribution elements 412 and 414 are preferably organized in the plunger assembly 410 relative to the cushion pad 440 such that the larger sized load distribution elements are further away from the cushion pad 440 than smaller sized load distribution elements. In this way, as the load increases, the load bearing surfaces upon which the load is distributed is increased due to the pressing down of the plunger assembly 410 into the cushion pad 440 as described hereafter. Only two load distribution elements 412 and 414 are shown in this depicted example for simplicity but any number of load distribution elements greater than one may be utilized without departing from the spirit and scope of the illustrative embodiments.

In the depicted example, the load distribution elements 412, 414 may be washers of increasing size, for example, but are not limited to such and any load distribution element may be utilized in the illustrative embodiments, e.g., conical elements as described hereafter, square, rectangular, or any other shape plates with increasing dimensions, or the like. The different sizes of load distribution elements 412, 414 serve to increasingly distribute the load imparted to the plunger assembly over a greater load bearing surface area as described hereafter. Thus, as shown in FIG. 4, the size of the load distribution elements 412 and 414 increases the further away from the cushion pad 440 the load distribution element 412, 414 is positioned. Thus, in the depicted example, the upper load distribution element 414 has a larger size than the lower load distribution element 412. This size differential, in one illustrative embodiment, is achieved by having load distribution elements 412, 414 that have different diameters or widths. That is, the load distribution elements 412 and 414 are circular in configuration and thus have differing diameters with the load distribution element 414 having a larger diameter than the lower load distribution element 412.

It should be appreciated that while the depicted example illustrates the plunger assembly 410 as having circular configured load distribution elements 412 and 414, the illustrated embodiments are not limited to such. To the contrary, the load distribution elements 412 and 414 may have any suitable configuration or shape as determined to be appropriate to the particular implementation sought. The key feature is that there is a difference in load distribution ability of the load distribution elements 412 and 414 and the load distribution elements 412 and 414 are positioned relative to the cushion pad 440 such that the load is distributed over increasingly larger load distribution elements 412 and 414 as the load of the product 460 increases, i.e. increasingly larger load distribution areas provided by larger sized load distribution elements 412, 414.

Thus, in the example illustrative embodiment in FIG. 4, the upper member 420, plunger assembly 410, and cushion pad 440 rest on the lower member 450. The palletized product 460 is placed on top of, and fastened to, the upper member 420 such that the weight of the palletized product 460 is born by the combination of the upper member 420, the plunger assembly 410, cushion pad 440, and lower member 450. It should be appreciated that as the load on the upper member 420 increases with an increased weight of the palletized product 460, the plunger assembly 410 is pressed into the cushion pad 440 such that larger load distribution elements 412, 414 of the plunger assembly 410 are pressed into the cushion pad 440 until the load is supported by the full area of the cushion pad 440.

That is, with very light loads the weight of the product 460, e.g., a rack of computer equipment, is carried by the smaller diameter load distribution element 412 resting on the cushion pad 440 (e.g., a neoprene pad), i.e. the load is distributed over the area 470 of the load distribution element 412. As the load on the pallet increases, such as due to an increase in the weight of the product 460, the area 470 of the smaller diameter load distribution element 412 is pressed downward into the cushion pad 440 and becomes fully embedded in the cushion pad 440. As a result, the area 480 of the larger diameter load distribution element 414 starts bearing on the cushion pad 440. Finally, under a maximum load, the upper member 420 of the pallet rests on the entire cushion pad 440 and the load of the product 460 is distributed over the entire area 490 of the cushion pad 440.

Thus, with the plunger assembly 410, as the load increases, the load bearing surface becomes larger such that the load is distributed over an increasing area and the cushion pad 440 becomes harder to compress, i.e. the isolation system becomes more stiff. This is not because of a change in the properties of the cushion pad 440, but because the load bearing surface is increased allowing more of the cushion pad 440 to support the load.

It should be appreciated that with the plunger assembly 410 of the illustrative embodiments, the plunger assembly 410 may be designed for any desired minimum load and any number of increases in load, represented by additional load distribution elements being provided in the plunger assembly 410, to what is considered to be a maximum feasible load for the pallet. While separate load distribution elements may be provided, the adjustment of the isolation system to the load is continuous rather than incremental since as the load increases, the plunger assembly 410 continuously bears down on the cushion pad 440 such that more and more surface area of the plunger assembly 410 is supported by the cushion pad 440 until all of the plunger assembly 410 is embedded in the cushion pad 440 and the entire cushion pad 440 then supports the load. That is, the plunger assembly 410 allows the isolation system 400 of the pallet to automatically adjust to different loads without the operator having to do anything other than load the product 460 onto the pallet.

It should be appreciated that while FIG. 4 illustrates only one such isolation system 400, the pallet may in fact comprise a plurality of such isolation systems 400 at various locations of the pallet, e.g., at each of the four corners of a rectangular pallet, at one or more locations between the four corners of the rectangular pallet, and/or at various other locations across the lower surface of the upper member 420 and upper service of the lower member 430 of the pallet.

The result is a stiffening compression curve which will adapt itself to any load placed on the pallet. Hence, the net result is that increasing mass on the pallet causes the isolation system 400, comprising the elements 410-450, to become stiffer such that the natural frequency remains approximately the same throughout the load range, i.e. a range from a minimum load to a maximum load (e.g., approximately 100 pounds to approximately 2000 pounds). Test results from a package test lab show that with a heavy load of approximately 2000 pounds, both the known shock pallet mechanisms and the pallet implementing the isolation system 400 of the illustrative embodiments, i.e. the load adapting pallet, have resonant frequencies of approximately 7 Hz (8 Hz for the known shock pallet and 7 Hz for the load adapting pallet of the illustrative embodiments). However, the difference between the known shock pallet mechanism and the load adapting pallet of the illustrative embodiments happens with lower load configurations. For example, for a minimum load configuration of approximately 100 pounds, the known shock pallet resonance frequency increase to 25 Hz which will cause connector wear in electronic systems that are loaded onto the shock pallet, however the load adapting pallet of the illustrative embodiments adjusts to the lighter load and the resonance frequency increases to only 13 Hz. At 13 Hz the load adapting pallet of the illustrative embodiments provides good vibration isolation and protects the critical components of the palletized product, e.g., the connectors of the rack of computing equipment or other electronic equipment.

Moreover, at the maximum load configuration, the known shock pallet has a transmissibility of approximately 3.1 and the load adapting pallet has a transmissibility of approximately 3.6. However, at the minimum load configuration, the known shock pallet has a transmissibility of approximately 4.7 while the load adapting pallet has a transmissibility of only 3.6. Thus, the transmissibility of the known shock pallet increases considerably with lower load whereas the transmissibility of the load adapting pallet remains constant regardless of load.

It should be appreciated that while the above illustrative embodiments are described with regard to increasing load, the mechanisms of the illustrative embodiments may also adjust to decreasing loads as well. The weight of the load is what controls the operation of the isolation system 400 such that increased load causes an increase in the stiffness of the isolation system 400 and pallet while a decreased weight decreases the stiffness. The cushion pad 440 is preferably manufactured from a material that may recover from compression in this manner, such as the neoprene material previously described above, such that the load may vary from lighter to heavier and from heavier to lighter without adversely affecting the ability of the isolation system 400 to isolate vibration.

In addition to being able to automatically adjust to changes in load of the palletized product, the isolation system of the illustrative embodiments may further provide mechanisms for controlling the amplitude of the pallet's resonance frequency. Normally, such as in the known shock pallet, the pallet resonance frequency is controlled with damping in the cushion pad material. However, if there is insufficient damping in the cushion pad material, the amplitude of the resonance frequency of the pallet may be so high that the palletized product can physically break the pallet and the palletized product can break away from the pallet as well, which may cause damage to the palletized product. However, as damping is increased, the peak in the transmissibility curve is lower and wider. Thus, with too much damping, the isolation system transfers more vibration to the palletized product in the problem frequency range, e.g., the 25 to 30 Hz range, for example.

Figure 5:
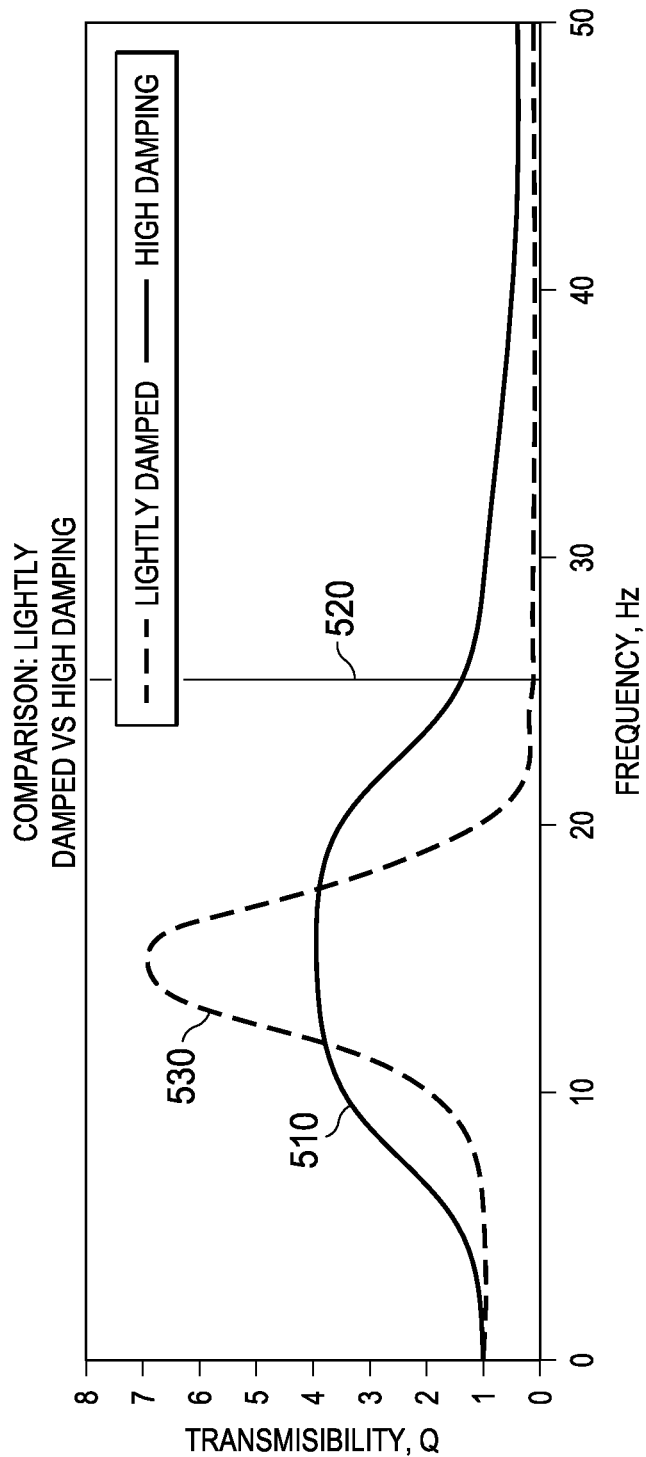
FIG. 5 illustrates an example plot of frequency versus transmissibility for lightly damped and highly damped isolation systems.

FIG. 5 illustrates an example plot of frequency versus transmissibility for lightly damped and highly damped isolation systems. As shown in FIG. 5, the highly damped pallet, represented by curve 510, inputs more vibration, i.e. has a higher transmissibility, at the problematic frequency of 25 Hz (represented by line 520), than the lower damped pallet represented by the curve 530. Thus, while it is preferable to have a lightly damped pallet for vibration transmissibility reasons, a lightly damped pallet would allow the resonance frequency to increase to a level where the palletized product may break the pallet as noted above.

It should be appreciated that, with the known shock pallets, the pallet is attached to the cushion pad in such a way that when the palletized product travels upwards, such as due to tipping of the pallet, a side force from a fork truck or traversing a grade such as a ramp or the like, the palletized product, which is attached to the pallet, applies a tension force on the cushion pad effectively pulling on the cushion pad, and the cushion pad then applies a downward force on the palletized product. This additional force on the cushion pad results in additional amplitude of the vibration that is transmitted to the palletized product.

With the mechanisms of the illustrative embodiments, to minimize the pallet resonance without resorting to high damping in the cushion pad material, and the associated problems with such high damping, as well as provide a restraint in the case of the palletized product tipping, a mechanism is provided for providing a single sided isolation system where the cushion pad is only compressed and not subject to tension. The mechanism provides a "single sided spring" operation in which only a compressive force is exerted upwards on the cushion pad 440 by the bottom member 450 of the pallet. The single sided spring operation is achieved by utilizing a soft but highly damped retention pad positioned between the upper surface of the upper member 420 of the pallet and a fastener end (or stop constraint) that is loosely attached, i.e. not fastened down to prevent movement of the retention pad. A gap exists between the highly damped retention pad and the fastener end to allow the isolation system to vibrate freely and thus, allows the palletized product to vibrate with lower amplitude due to less transmissibility, as a single sided spring would. In the event that the palletized product starts to tip due to handling, since the palletized product is fastened to the upper member 420 of the pallet, the upper member 420 of the pallet moves upward along a path constrained by the fastener until the retention pad is brought into contact with the fastener end to thereby prevent the palletized product from overturning.

Figure 6:
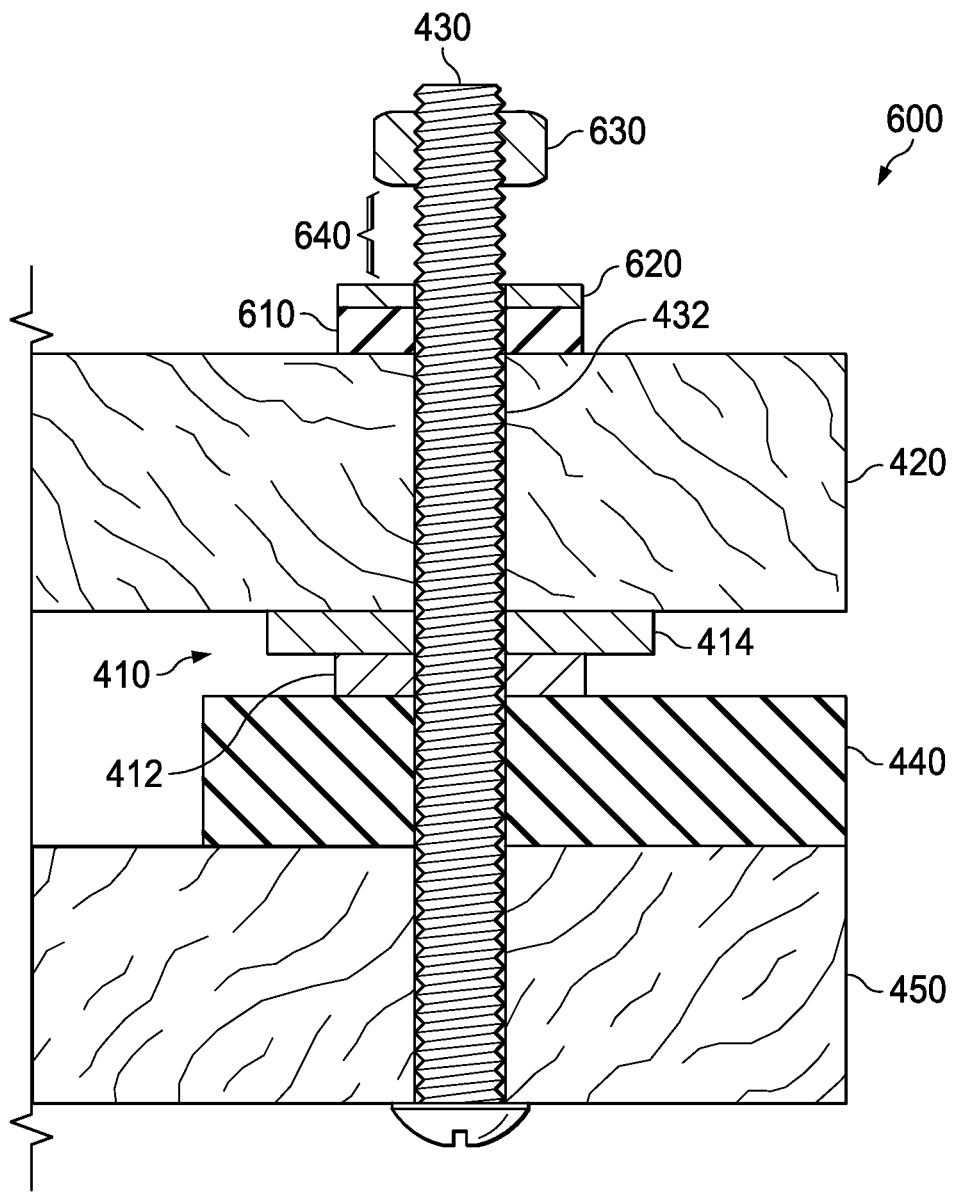
FIG. 6 is an example diagram illustrating the retention pad in combination with the isolation system having the plunger assembly and cushion pad in accordance with one illustrative embodiment.

FIG. 6 is an example diagram illustrating the retention pad in combination with the isolation system having the plunger assembly and cushion pad in accordance with one illustrative embodiment. As shown in FIG. 6, the isolation system comprises the same components as discussed above with regard to FIG. 4 and thus, like elements are shown with like reference numerals. Thus, the isolation system 600 comprises the plunger assembly 410 comprising the load distribution elements 412, 414, the upper member 420 of the pallet, the fastener 430, the cushion pad 440, and the lower member 450 of the pallet.

In addition to these elements, the depicted isolation system 600 further comprises a retention pad 610, a washer 620, and a fastener end or stop constraint 630, such as a nut, fastener cap, or other fastener stop constraint that prevents the other elements 410, 420, 440, 450, 610, and 620 from sliding off of the fastener core member 432. The retention pad 610 may be fabricated from any suitable soft but highly damped material, such as an elastomer material, suitable non-elastomer material such as those described above with regard to the cushion pad 440, or the like. In one illustrative embodiment, the retention pad 610 is also formed from a neoprene material that the cushion pad 440 is fashioned from, although the material properties may be different depending on the implementation. The washer 620 and stop constraint 630 may be made of any suitable material providing a strong enough material to resist impacts, e.g., a metal material or the like.

The retention pad 610 and washer 620 may have a hole through which the fastener core member 432, e.g., a bolt, screw, rod, or the like, of the fastener 430 may pass in a similar to the holes in the other elements 410, 420, 440, and 450 which allow the bolt 432 to pass through these elements. Moreover, the fastener stop constraint 630 may be integrated in the fastener core member (e.g., a bolt) 432 or otherwise affixed to the fastener core member 432 such that it serves as a stop constraint for the other elements of the isolation system 600. The washer 620 may provide the retention pad 610 with protection from impacts with the stop constraint 630.

A gap 640 is present between the retention pad 610/washer 620 and the stop constraint 630 so as to provide an area where there is freedom of motion of the elements 610, 620, and 410-450 along the fastener core member 432. This loose configuration allows all of the elements 410, 420, 440, 450, 610, and 620 to be loosely coupled to the fastener core member 432 (hereafter using a "bolt" as an example of element 432) such that they may move to a certain degree along the long axis of the bolt 432, e.g., in an upward and downward motion along the bolt 432 depicted in FIG. 6. This effectively allows the isolation system to vibrate freely and reduce the amount of vibration transmitted to the palletized product 460 which is attached to the upper member 420 of the pallet.

Because of the configuration of the isolation system 600 elements, the isolation system 600 is a single sided isolation system where the cushion pad 440 is only compressed and not subject to tension. The mechanism provides a "single sided spring" operation in which only a compressive force is exerted upwards on the cushion pad 440 by the bottom member 450 of the pallet since the gap 640 provides a freedom of motion that eliminates any tension force being applied by the upper member 420 on the cushion pad 440. The gap 640 between the highly damped retention pad 610 and the stop constraint 630 allows the isolation system 600 to vibrate freely and thus, allows the palletized product 460 to vibrate with lower amplitude due to less transmissibility.

In the event that the palletized product 640 starts to tip due to handling, the upper member 420, and the other elements 410-450 of the isolation system 600 of the pallet moves upward along a path constrained by the fastener core member 432, pushing the retention pad 610 and washer 620 upwards until the retention pad 610 and washer 620 are brought into contact with the stop constraint 630 to thereby prevent the palletized product from overturning. Thus, the lower member 450 applies a compressive force against the cushion pad 440 while the elements above the cushion pad 440 do not apply a force to the cushion pad 440 until the cushion pad 440 is pressed against them due to the motion being stopped by the stop constraint 630. Thus, on both sides, the cushion pad 440 is only subjected to compressive forces eliminating the problems associated with known shock pallets where tension forces may cause the cushion pad to fail and the pallet to break, resulting in damage to the palletized product and potential injury or death of individuals involved in the transportation of the palletized product.

Figure 7:
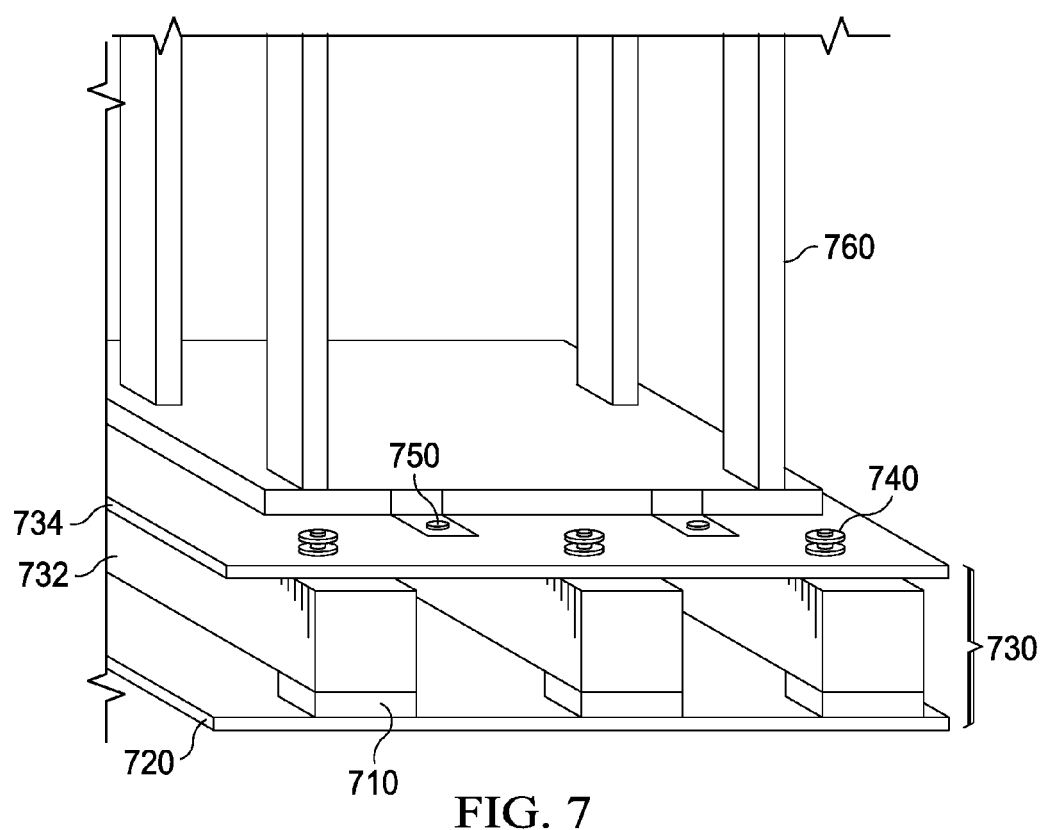
FIG. 7 is a diagram illustrating a pallet that implements a load adjusting vibration isolation system of the illustrative embodiments.

FIG. 7 is a diagram illustrating a pallet that implements a load adjusting isolation system of the illustrative embodiments. As shown in FIG. 7, the pallet 700 is comprised of a plurality of cushion pad and plunger assemblies 710 sandwiched between a lower member or deck 720 and an upper member or deck 730 of the pallet 700. The upper member or deck 730 may in fact be provided as multiple wood beams 732 with a wood decking 734 placed across the wood beams as shown in FIG. 7 in which case there may be a plurality of isolation systems provided in association with each of the wood beams, e.g., two isolation systems for each wood beam located at the two ends of each beam with the cushion pad and plunger assemblies 710 being sandwiched between the wood beam of the upper deck 730 and the lower deck 720 as shown. The retention pad assemblies 740 comprising the retention pad, washers, gap, and stop constraint, for each isolation system may be provided above the wood decking that is placed across the wood beams of the upper deck 730.

The palletized product 760 is placed on top of the upper deck 730 and is fastened to the upper deck 730 by way of fasteners 750, e.g., nut and bolt assemblies with appropriate metal plates to provide strength of the attachment if necessary. Thus, the palletized product 760 is fastened to the upper deck 730 such that if the pallet 700 is tipped this causes an upward force on the upper deck 730 which closes the gap in the retention pad assemblies 740 on at least one side of the pallet 700 while on the opposite side of the pallet 700, the gap is increased by a downward force being applied to the isolation assemblies 710. Thus, on one side of the pallet, the upward force compresses the retention pad, while on the other side of the pallet, the downward force likewise compresses the cushion pad of the isolation system, thereby avoiding any tension in the cushion pad that might lead to pallet breakage. Furthermore, the stop constraint prevents the upper deck 730 from coming off of the fasteners of the isolation system and thereby eliminates the potential for rollover of the palletized product 760.

Figure 8:
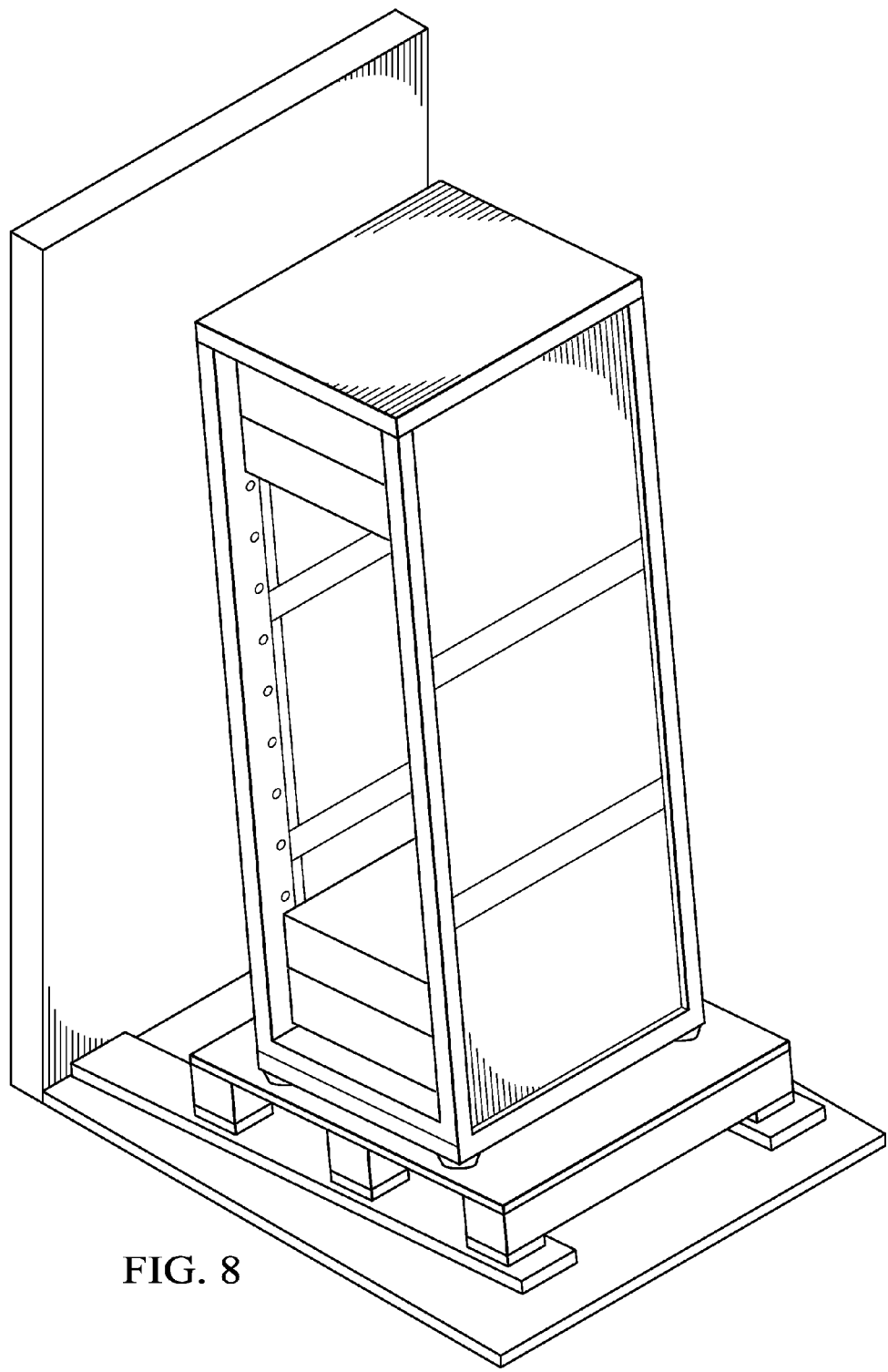
FIG. 8 illustrates the load adapting vibration isolation pallet during a tipping condition.

FIG. 8 illustrates the pallet 700 during a tipping condition, such as may have occurred due to operation of a fork truck with the pallet 700, movement of the pallet up a ramp or other incline or grade, motion of a vehicle transporting the pallet 700, or the like. As can be seen from FIG. 8, the palletized product remains attached to the pallet 700 and the pallet 700 does not break. Thus, the single sided isolation system with a retention pad and stop constraint allow for reduced vibration levels in shipping compared to a conventional shock pallet and still prevent product overturning.

It should be appreciated that the above description provides examples of configurations of the isolation system and load adapting vibration isolation pallet of the present invention, but the present invention is not limited to these particular example configurations. To the contrary, many modifications can be made to the example configurations without departing from the spirit and scope of the illustrative embodiments.

Figure 9:
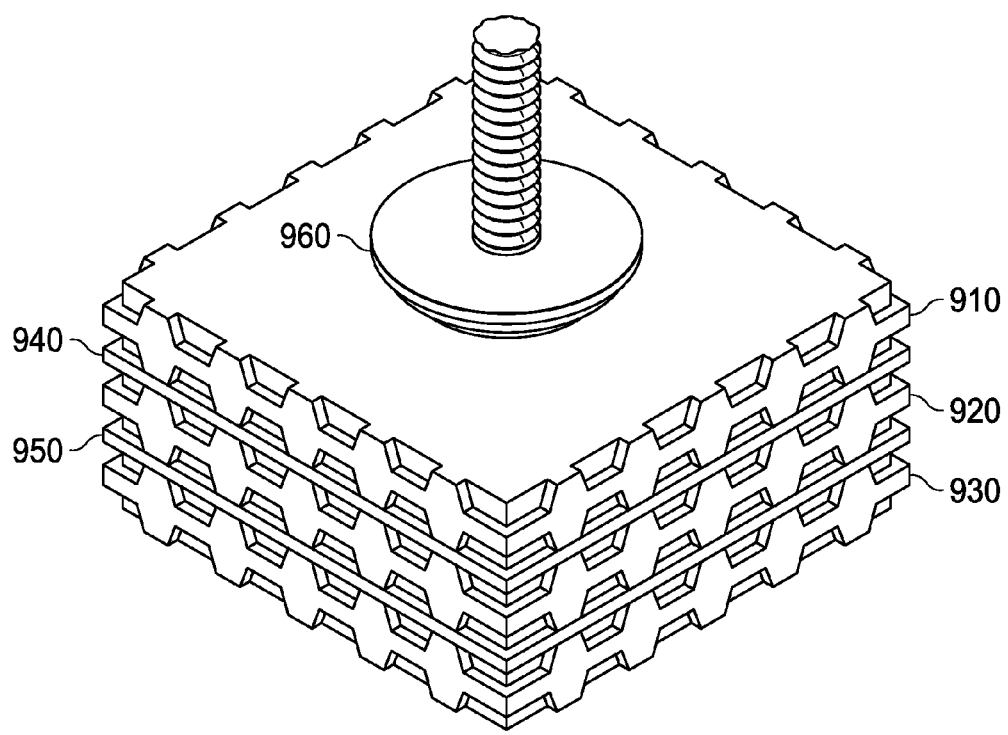
FIG. 9 illustrates an alternative configuration of a cushion pad in accordance with one illustrative embodiment.

For example, while the above illustrative embodiments reference the cushion pad as a single pad, the illustrative embodiments are not limited to such. Rather, the cushion pad may in fact be comprised of multiple layers of cushioning material, such as shown in FIG. 9. As shown in FIG. 9, three layers 910-930 of cushioning material, e.g., neoprene material, are provided with support plates 940-950 being provided sandwiched between the layers 910-930. The support plates 940-950 may be fashioned from a strong material such as metal, a strong plastic material, other elastomer or non-elastomer material, or the like. The layers 910-930 themselves may take on many different configurations of size and shape. In the depicted example, the layers 910-930 are cushion pad layers formed in a waffle type configuration in which there are holes or recesses in the material in a lattice formation.

As shown in FIG. 9, the plunger assembly 960 may be provided in the manner previously described above and, as shown in this example diagram may have many more load distribution elements than the two previously described above. For example, in the example depicted in FIG. 9, there are 5 such load distribution elements shown. Moreover, the fastener core member need not be a bolt as previously described and in fact may be any fastener core member with the example shown in FIG. 9 being a threaded screw or bolt. Although not explicitly shown in the figures, a foam material or other type of material may be used around the isolation system to help keep the isolation system properly oriented with regard to the upper and lower decks of the pallet.

Figure 10:
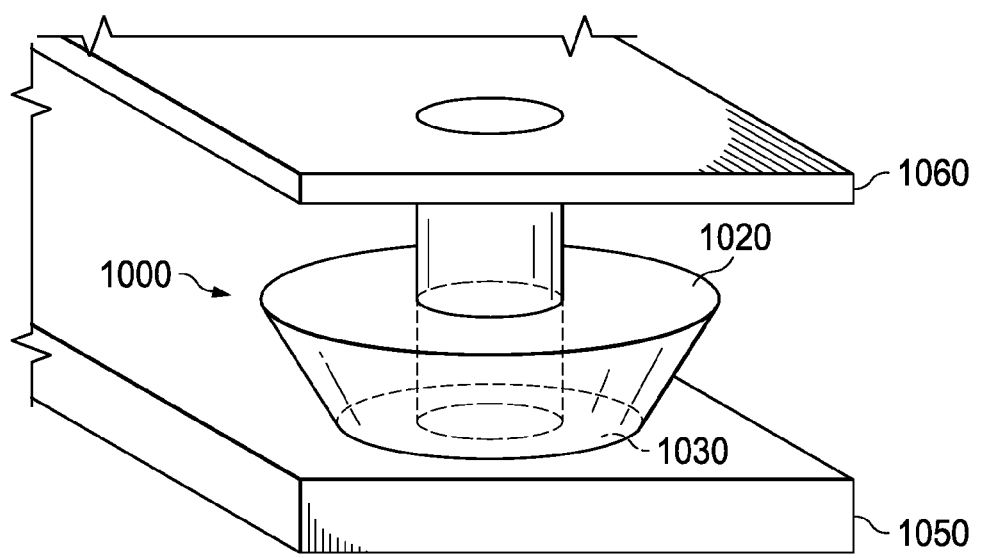
FIG. 10 illustrates an alternative configuration of a plunger assembly in accordance with one illustrative embodiment.

To further illustrate the possible modifications to the mechanisms previously described above, while the plunger assembly has been described as comprising a plurality of load distribution elements arranged in a stack formation with progressing from smaller sized load distribution element to larger sized distribution element, the illustrative embodiments are not limited to such. Rather, in another illustrative embodiment, the plunger assembly may be fashioned as one piece rather than separate load distribution elements configured in a stack formation. FIG. 10 illustrates one example of a single piece plunger assembly in accordance with this alternative illustrative embodiment.

As shown in FIG. 10, the plunger assembly 1000 comprises a cone shaped body 1010 having a substantially flat upper surface 1020 and a substantially flat bottom surface 1030. The substantially flat bottom surface 1030 is configured to contact and press into the cushion pad 1050 while the substantially flat upper surface 1020 is configured to abut and contact the upper member 1060 or deck of the pallet. Thus, as more load is applied to the pallet, the plunger assembly 1000 is pressed further into the cushion pad 1050 and more surface area 1040 of the plunger assembly 1000 contacts the cushion pad 1050 thereby increasing the load bearing area of the plunger assembly 1000 and cushion pad 1050 being used to support the load. Thus, the cone configuration shown in FIG. 10 performs a similar operation as the stacked configuration of the plunger assembly previously described above, but utilizes a single formed piece as opposed to multiple load distribution elements provided in a stacked formation.

It should further be appreciated that not only does the present invention provide the isolation system and load adapting vibration isolation pallet themselves, but a method of making or providing such an isolation system and load adapting vibration isolation pallet. This method may comprise, for example, providing the lower member or deck of the pallet with a hole or opening through which the fastener core member may pass and then feeding the fastener core member through that opening. The cushion pad, with a similar opening, may be placed on top of the lower member or deck of the pallet by sliding the cushion pad down the length of the fastener core member (e.g., bolt) using the opening in the cushion pad to permit the fastener core member to pass through the cushion pad.

In a similar manner, the plunger assembly is placed in position above the cushion pad. If the plunger assembly is comprised of a plurality of load distribution elements, each load distribution element may be individually placed in position above the cushion pad by sliding them along the fastener core member via a hole or opening in the load distribution elements (e.g. washers with center holes with the washers being of increasing diameter). Thereafter, the upper member may be put into place by providing a hole in the upper member of the pallet and allowing the fastener core member to pass through the hole. If no retention pad assembly is utilized, a stop constraint (e.g., nut) may be used with the fastener core member to fasten the upper member to the other elements of the isolation system. If a retention pad assembly is utilized, the retention pad and washer may then be place above the upper member or deck of the pallet by similarly sliding them over the fastener core member using a hole or opening provided in the retention pad and washer. The stop constraint may then be loosely fastened to the fastener core member leaving a gap between the stop constraint and the retention pad assembly.

Thus, the mechanisms of the illustrative embodiments provide a load adapting vibration isolation system and pallet for use in transporting products that are sensitive to vibration and may be damaged if the pallet is overturned. The mechanisms of the illustrative embodiments minimize vibration transmissibility in a problem frequency range by providing an isolation system that adapts to various loads by way of the use of the novel plunger assembly and cushion pad configuration described above. Moreover, the mechanisms of the illustrative embodiments control the resonance frequency of the isolation system while providing mechanisms to avoid overturning of the pallet by providing a novel fastener and retention pad system that allows free vibration of the isolation system without increasing the transmissibility to the palletized product.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An isolation system for a transportation pallet, comprising:
   a plunger assembly comprising a graduated surface area having a first end of the plunger assembly with a relatively smaller surface area than a second end having a relatively larger surface area; and
   a cushion pad coupled to the plunger assembly such that when a load is applied to the plunger assembly, the plunger assembly is pressed into the cushion pad to cause the cushion pad to bear the load over a surface area of the plunger assembly corresponding to the magnitude of the load, and wherein as the load is increased a larger surface area of the plunger assembly and the cushion pad supports the load and as the load decreases, a smaller surface area of the plunger assembly and cushion pad supports the load.

2. The isolation system of claim 1, wherein the cushion pad comprises one or more layers of an elastomer material.

3. The isolation system of claim 2, wherein the elastomer material is a neoprene material designed to provide a resonance frequency of the transportation pallet at approximately 13 Hz.

4. The isolation system of claim 1, wherein the plunger assembly comprises a plurality of load distributing elements configured in a stack, and wherein at least one load distributing element of the load distributing elements has a larger load bearing surface than at least one other load distributing element in the stack.

5. The isolation system of claim 1, wherein the plunger assembly comprises a single conical shaped piece having a relatively smaller load bearing surface area positioned closest to the cushion pad and a relatively larger load bearing surface area positioned furthest from the cushion pad.

6. The isolation system of claim 1, wherein:
   the plunger assembly and cushion pad are coupled to one another by a fastener core member passing through the plunger assembly and cushion pad;
   the isolation system further comprises a retention pad and stop constraint coupled to the plunger assembly and cushion pad via the fastener core member; and
   the retention pad and stop constraint are loosely coupled to the fastener core member to allow movement of the isolation system and transportation pallet along a long axis of the fastener core member.

7. The isolation system of claim 6, wherein the retention pad and stop constraint are positioned along the fastener core member to permit a fixed amount of movement of the plunger assembly, cushion pad, and transportation pallet due to side forces or tipping of the transportation pallet.

8. The isolation system of claim 6, wherein the plunger assembly and cushion pad are positioned along the fastener core member between a lower deck and an upper deck of the transportation pallet, and the retention pad and stop constraint are positioned above the upper deck of the transportation pallet along the fastener core member.

9. The isolation system of claim 8, wherein the retention pad sits on an upper surface of the upper deck when no tipping of the transportation pallet occurs and there is a gap along the fastener core member between the retention pad and the stop constraint, and wherein when tipping of the transportation pallet occurs, the retention pad, upper deck, plunger assembly, cushion pad, and lower deck are free to move along a long axis of the fastener core member until the retention pad abuts the stop constraint.

10. The isolation system of claim 9, wherein the cushion pad is subjected to only compression forces by the transportation pallet during tipping of the transportation pallet due to the gap.

11. An isolation system for a transportation pallet, comprising:
a plunger assembly comprising a graduated surface area having a first end of the plunger assembly with a relatively smaller surface area than a second end having a relatively larger surface area; and
a cushion pad coupled to the plunger assembly such that when a load is applied to the plunger assembly, the plunger assembly is pressed into the cushion pad to cause the cushion pad to bear the load over a surface area of the plunger assembly corresponding to the magnitude of the load, and wherein as the load is increased a larger surface area of the plunger assembly and the cushion pad supports the load and as the load decreases, a smaller surface area of the plunger assembly and cushion pad supports the load, wherein:
the plunger assembly and cushion pad are coupled to one another by a metal bolt passing through the plunger assembly and cushion pad, and a metal nut at one end of the bolt preventing the plunger assembly and cushion pad from moving beyond the end of the bolt;
the plunger assembly is a stack of metal washers of differing diameter, wherein the diameter of the washers in the stack increases with increased distance from the cushion pad; and
the cushion pad is a pad comprising one or more layers of neoprene material.

12. The isolation system of claim 1, wherein the isolation system, via the plunger system and cushion pad, automatically adjusts for varying loads from a minimum design load to a maximum design load to provide a same vibration transmissibility over the entire range from minimum design load to maximum design load.

13. The isolation system of claim 1, wherein the isolation system reduces transmissibility of vibration to the transportation pallet in the frequency range of 25 to 30 Hz.

14. A transportation pallet for transporting sensitive products, comprising:
a pallet comprising an upper deck and a lower deck; and
an isolation system located between the upper deck and the lower deck of the pallet, wherein the isolation system comprises:
a plunger assembly comprising a graduated surface area having a first end of the plunger assembly with a relatively smaller surface area than a second end having a relatively larger surface area; and
a cushion pad coupled to the plunger assembly such that when a load of a product loaded onto the pallet is applied to the plunger assembly via the upper deck of the pallet, the plunger assembly is pressed into the cushion pad to cause the cushion pad to bear the load over a surface area of the plunger assembly corresponding to the magnitude of the load, and wherein as the load is increased a larger surface area of the plunger assembly and the cushion pad supports the load and as the load decreases, a smaller surface area of the plunger assembly and cushion pad supports the load.

15. The transportation pallet of claim 14, wherein the cushion pad comprises one or more layers of an elastomer material.

16. The transportation pallet of claim 14, wherein the plunger assembly comprises at least one of:
a plurality of load distributing elements configured in a stack, wherein at least one load distributing element of the load distributing elements has a larger load bearing surface than at least one other load distributing element in the stack; or
a single conical shaped piece having a relatively smaller load bearing surface area positioned closest to the cushion pad and a relatively larger load bearing surface area positioned furthest from the cushion pad.

17. The transportation pallet of claim 14, wherein:
the plunger assembly and cushion pad are coupled to one another by a fastener core member passing through the plunger assembly and cushion pad;
the isolation system further comprises a retention pad and stop constraint coupled to the plunger assembly and cushion pad via the fastener core member; and
the retention pad and stop constraint are loosely coupled to the fastener core member to allow movement of the isolation system and pallet along a long axis of the fastener core member.

18. The transportation pallet of claim 17, wherein the retention pad and stop constraint are positioned along the fastener core member to permit a fixed amount of movement of the plunger assembly, cushion pad, and pallet due to side forces or tipping of the transportation pallet.

19. The transportation pallet of claim 17, wherein the plunger assembly and cushion pad are positioned along the fastener core member between a lower deck and an upper deck of the transportation pallet, and the retention pad and stop constraint are positioned above the upper deck of the transportation pallet along the fastener core member.

* * * * *